Dec. 7, 1943.  C. D. LOWRY, JR., ET AL  2,336,109
PROCESS FOR SWEETENING GASOLINE
Filed Aug. 15, 1940
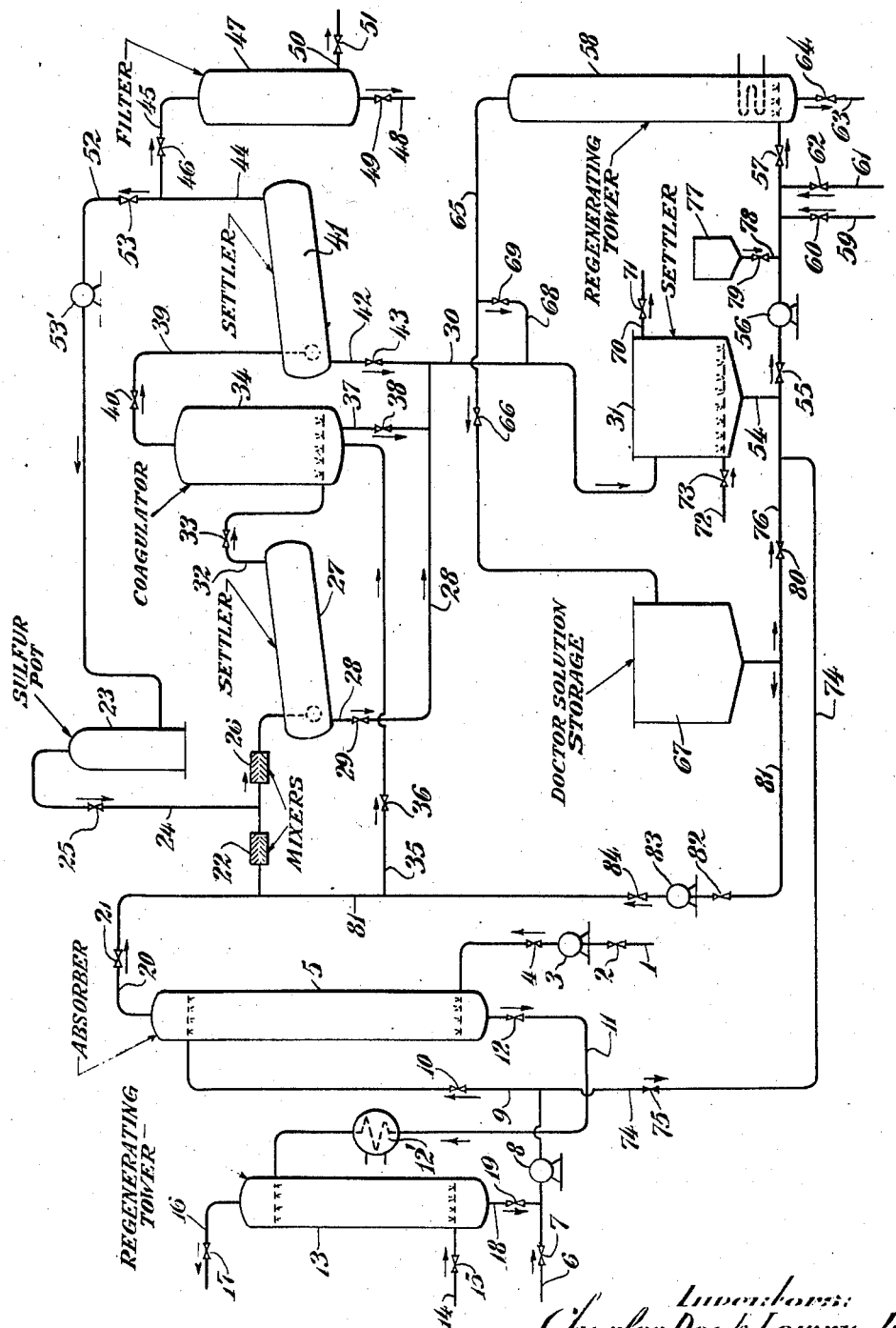
Inventors:
Charles Doak Lowry, Jr.
Robert F. Sutherland
By Lee J. Gary
Attorney.

Patented Dec. 7, 1943

2,336,109

UNITED STATES PATENT OFFICE 2,336,109

PROCESS FOR SWEETENING GASOLINE

Charles Doak Lowry, Jr., and Robert E. Sutherland, Chicago, Ill., assignors to Universal Oil Products Company, Chicago, Ill., a corporation of Delaware Application August 15, 1940, Serial No. 352,694

2 Claims. (Cl. 196—32)

This invention relates to a process for treating hydrocarbon oil to improve the odor thereof. More particularly it relates to a process for sweetening hydrocarbon distillate of gasoline boiling range.

In one specific embodiment the present invention is a process for desulfurizing and sweetening gasoline for the purpose of improving the valuable characteristics thereof which comprises contacting said hydrocarbon oil with an aqueous solution of an alkali metal hydroxide, recovering the solution and regenerating it, separating the gasoline, mixing it with sodium plumbite solution, adding thereto sufficient sulfur to bring about the sweetening reaction, further mixing the mixture, removing a major portion of the spent doctor solution, contacting the sweetened gasoline with an additional portion of fresh doctor solution, separating the gasoline and removing remaining treating solution therefrom, subjecting said spent doctor solution to reactivation in the presence of air and returning a portion of the regenerated solution for further use in the process.

The process as practiced is illustrated in the accompanying drawing which is diagrammatic and not drawn to scale.

Sour gasoline is introduced through line 1, valve 2, pump 3 and valve 4 to absorber 5 which is a vertical tower wherein contact between an aqueous solution of an alkali metal hydroxide such as sodium hydroxide, otherwise known as caustic soda, is effected at a temperature of approximately 50–100° F. The tower may be equipped with contacting members such as side-to-side baffles, perforated plates, bubble decks and the like. In starting up the process, aqueous caustic solution is introduced through line 6, valve 7, pump 8, line 9 and valve 10 to the top of absorber 5. After the process has continued to operate, makeup caustic is introduced through this line. The caustic solution may be used in concentrations of approximately 5-50%, although a solution of about 15% concentration is usually used. Spent caustic solution is withdrawn from the absorber through line 11, valve 12 and heater 12', entering the top of regenerating tower 13. Steam is introduced at the bottom of the tower through line 14 and valve 15, passing upward countercurrent to the spent caustic solution. Mercaptans are hydrolyzed by the action of the steam under the reactivating conditions which are normally in the range of approximately 160–250° F. The mercaptans are removed through line 16 and valve 17 to be disposed of. The regenerated caustic solution is passed through line 18 and valve 19 by pump 8 to line 9 and thence to absorber 5. The caustic-scrubbed gasoline, which by this treatment is appreciably reduced in mercaptan content, is passed through line 20 and valve 21 to mixer 22. Sodium plumbite solution is mixed with the gasoline, entering from line 81. Mixer 22 may be any type of mixer, such as orifice plates or pipe mixers containing baffles and the like. The gasoline after leaving the mixer is blended with additional gasoline containing elemental sulfur, entering from sulfur pot 23 through line 24 and valve 25. Sufficient sulfur is added to cause a reaction between the lead mercaptides in the gasoline, thereby converting the mercaptans to alkyl disulfides and lead sulfide. The mixture passes through mixer 26 where additional mixing and reaction occurs, and from thence into settler 27. The treated mixture is usually introduced through a spray nozzle at a point below the surface of the gasoline in settler 27. A major portion of the spent doctor solution together with lead sulfide in suspension separates from the gasoline. The spent treating agent is removed through line 28 and valve 29 to line 30 and thence to settler 31 wherein it is treated as hereinafter described. A level of doctor solution is maintained in settler 27 at all times. Treated gasoline which may contain small amounts of suspended doctor solution and lead sulfide is removed through line 32 and valve 33 to coagulator 34. The coagulator is a vertical drum containing fresh doctor solution which is introduced through line 35 and valve 36, and a portion of which may be removed through line 37, valve 38 to line 28 and thence to settler 31. The gasoline is introduced at the bottom of the coagulator through a spray in order to insure adequate contact with the doctor solution at this point. By this means any unreacted mercaptans are caused to react and lead sulfide is to a large extent coagulated into particles which are more readily separated from the sweetened gasoline. The gasoline passes overhead through line 39 and valve 40 to settler 41. Here again it is introduced through a spray below the surface of the liquid. The spent treating solution and lead sulfide separates substantially completely from the gasoline in this settler and is removed through line 42 and valve 43 to line 30 and thence to settler 31. The sweetened gasoline is removed from settler 41 through lines 44 and 45 and valve 46 to filter 47 which may comprise a drying tower, sand filter or a water washing tower to remove remaining traces of entrained alkaline solution. Such of the solution as may be knocked out is removed through line 48 and valve 49. The clear sweetened gasoline is removed through line 50 and valve 51 to storage. When sweetening cracked gasolines or blends containing cracked gasoline, it is the usual practice to add gum inhibitors to the gasoline at this point.

A portion of the sweetened gasoline from line 44 may be passed through line 52, valve 53 and pump 53' to sulfur pot 23, which contains lumps or rolls of sulfur, a part of which dissolves in the gasoline and is used in the sweetening reaction.

The spent doctor solution in settler 31 may be passed through line 54, valve 55, pump 56 and valve 57 to regenerating tower 58. Steam may be added through line 59 and valve 60, and air for effecting the regeneration may be added through line 61 and valve 62. The regenerating tower containing contacting members such as baffles or perforated plates for effecting adequate contact between the spent treating solution and the column may be drained, when desired through line 63 and valve 64. The regenerated solution is removed through line 65 and valve 66 to storage tank 67. The regeneration of doctor solution is usually carried out at a temperature of approximately 170–250° F., and it has been found that the use of slightly superatmospheric pressure, say of the order of 25–100 pounds per square inch on the regenerating tower 58 is helpful in obtaining complete reactivation. A portion of the solution may be passed through line 68 and valve 69 to line 30 and thus recirculated for additional regeneration. Gasoline which may be contained in the spent treating solution may be removed from settler 31 by way of line 70 and valve 71 to the sump. The tank is further provided with line 72 and valve 73 through which air may be added to maintain the lead sulfide more or less in suspension. In carrying out the regeneration, it is sometimes desirable to introduce sour plant gases through line 72 and valve 73 whereby any remaining plumbite in the spent solution is precipitated as lead sulfide.

Spent caustic solution comprising largely sodium sulfide is then removed through line 70 and valve 71. The remaining solution containing lead sulfide is made up to strength by introducing a mixture of fresh and regenerated caustic solution through line 74 and valve 75, joining with line 76. The lead concentration is made up when necessary by adding litharge from slurry pot 77, entering through line 78 and valve 79. A portion of the doctor solution from storage 67 may be passed through line 76 and valve 80 to regenerating tower 58. The doctor solution for use in the plant is passed through line 81, valve 82, pump 83 and valve 84 and thence by previously described routes to the sweetening plant. A portion of the doctor solution as previously indicated, passes through line 35 to coagulator 34.

The advantage of the present process over those usually used lies in the combination of steps employed whereby improved results are obtained. One of these advantages lies in utilizing the caustic solution to the best advantage for removing a portion of the mercaptans from the gasoline and using a part of the regenerated caustic to make up the doctor solution to be used in the subsequent doctor sweetening step.

By first mixing the doctor solution and the sour gasoline, followed by adding the sulfur, the amount of elemental sulfur necessary to completely sweeten the gasoline and to cause ready separation of the lead sulfide may be reduced. By using the coagulator after the initial settling step, it is possible to bring about a greater recovery of chemicals and a cleaner separation of gasoline than by the usual methods of operation. This is important not only from the standpoint of saving chemicals, but also because the sweetened gasoline may be used in blends containing gum inhibitors, many of which are soluble in alkaline solutions and removed thereby. A further advantage of the process lies in the method of reactivating under pressure and of making up fresh doctor solution during the regeneration step.

The following example is given to illustrate the usefulness and practicability of the process, but should not be construed as limiting it to the exact properties used therein.

A West Texas cracked gasoline, when treated by the usual method of operation, had an induction period of 90 minutes which increased with 0.01% of a commercial gum inhibitor to 215 minutes. The copper dish gum, after treatment, amounted to 100 ml. per 100 cc. The gasoline contained 0.02% of free sulfur. The octane number was 68.1. After sweetening according to the method of the present process, an induction period of 345 minutes and a copper dish gum of 18 ml. per 100 cc. were obtained when using 0.01% of the commercial inhibitor. The free sulfur content was 0.002% and the octane number was 69.3. In addition, approximately 30% less caustic was required than in the previous mode of operation and the saving of about 30% of lead oxide was also observed when the plant operation was converted to that of the present invention over that obtained by the conventional method of operation.

We claim as our invention:

1. A process for sweetening gasoline which comprises contacting said gasoline with an aqueous solution of sodium hydroxide at a temperature of approximately 50–100° F., separating the spent solution, treating it in the presence of steam to regenerate it, returning a portion of the regenerated sodium hydroxide for further use in the process, supplying another portion of said solution for use in the doctor solution regeneration step as hereinafter described, contacting the gasoline washed with said sodium hydroxide solution with doctor solution to form lead mercaptides, adding thereto sulfur dissolved in sweetened gasoline to convert said mercaptides to disulfides and lead sulfide, removing a major portion of the spent doctor treating solution, contacting the gasoline with fresh doctor solution, separating the gasoline therefrom, passing the spent doctor treating solution to a doctor regeneration plant, treating the spent solution with a hydrogen sulfide-containing gas to precipitate the lead sulfide dissolved therein, removing the spent alkaline solution, mixing the lead sulfide so precipitated with a portion of the sodium hydroxide solution from the aforesaid regeneration step as previously set forth, contacting the mixture with air, thereby regenerating said solution, and returning a portion of said solution for use in the doctor treating step.

2. A process for sweetening gasoline which comprises treating said gasoline with an aqueous solution of sodium hydroxide to remove a portion of the mercaptans therefrom, recovering the spent sodium hydroxide solution, treating it with steam at a temperature within the range of approximately 160-250° F., to regenerate it, returning a portion of the regenerated solution together with additional fresh solution to said treating step, separating the gasoline, mixing it with doctor solution to convert the mercaptans contained therein into lead mercaptides, adding free sulfur dissolved in sweetened gasoline to convert said mercaptides into lead sulfide and organic disulfides, separating a major portion of the spent treating solution in a primary settling step, contacting the treated gasoline with fresh doctor solution in a secondary step, separating additional spent treating solution from said gasoline in a tertiary step, recovering the sweetened gasoline, passing the spent doctor treating solution to a reactivation step, contacting it with an oxygen-containing gas at a temperature of approximately 170-250° F., recovering the regenerated solution and returning it for further use in the sweetening process.

CHARLES DOAK LOWRY, Jr.
ROBERT E. SUTHERLAND.